United States Patent
Weber et al.

(10) Patent No.: US 10,886,825 B2
(45) Date of Patent: Jan. 5, 2021

(54) ROTOR FOR AN ELECTRIC MACHINE, THE ROTOR HAS SHORT CIRCUIT BARS, SHORT CIRCUIT RING, AND SUPPORT DISC OF DIFFERENT MATERIALS

(71) Applicant: AUDI AG, Ingolstadt (DE)

(72) Inventors: Korbinian Weber, Ingolstadt (DE); Jörg Rücker, Hilpoltstein (DE); Peter Suess, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 295 days.

(21) Appl. No.: 15/952,501

(22) Filed: Apr. 13, 2018

(65) Prior Publication Data
US 2018/0323690 A1 Nov. 8, 2018

(30) Foreign Application Priority Data
May 8, 2017 (DE) .......................... 10 2017 207 671

(51) Int. Cl.
*H02K 17/16* (2006.01)
*H02K 15/00* (2006.01)
*H02K 15/02* (2006.01)

(52) U.S. Cl.
CPC ....... *H02K 17/165* (2013.01); *H02K 15/0012* (2013.01); *H02K 15/02* (2013.01)

(58) Field of Classification Search
CPC ...... H02K 17/165; H02K 17/16; H02K 17/18; H02K 17/185; H02K 17/20; H02K 17/205; H02K 15/0012; H02K 15/02
USPC ......... 310/112, 166, 216.129, 427, 432, 125, 310/124, 261.1, 262, 216.114, 210, 211, 310/212
See application file for complete search history.

(56) References Cited

U.S. PATENT DOCUMENTS

| | | | | |
|---|---|---|---|---|
| 6,177,750 | B1 * | 1/2001 | Tompkin | H02K 1/28 310/211 |
| 7,504,756 | B2 * | 3/2009 | Caprio | H02K 17/165 310/211 |
| 8,684,257 | B2 * | 4/2014 | Osborne | H02K 15/0012 228/165 |
| 8,791,618 | B2 * | 7/2014 | Kajiya | H02K 17/16 310/211 |
| 9,083,221 | B2 * | 7/2015 | Kleber | H02K 15/0012 |

(Continued)

FOREIGN PATENT DOCUMENTS

| | | |
|---|---|---|
| CN | 102651596 A | 8/2012 |
| CN | 102801259 A | 11/2012 |

(Continued)

OTHER PUBLICATIONS

Examination Report dated Apr. 8, 2020 in corresponding European Application No. 18 164 914.6; 10 pages including partial machine-generated English-language translation.

(Continued)

*Primary Examiner* — Maged M Almawri
(74) *Attorney, Agent, or Firm* — Maier & Maier, PLLC

(57) ABSTRACT

A rotor for an electric machine. A laminated core with a plurality of short-circuit bars that pass through it and are joined at both ends by way of a respective short-circuit ring. A support disc, which is made of a material that has a higher strength than the material of the short-circuit ring, is axially arranged at each short-circuit ring.

10 Claims, 1 Drawing Sheet

(56) References Cited

U.S. PATENT DOCUMENTS

| | | | | |
|---|---|---|---|---|
| 2012/0293036 A1* | 11/2012 | Kleber | ................. | H02K 17/165 310/211 |
| 2013/0106233 A1* | 5/2013 | Hanamachi | .......... | H02K 17/165 310/211 |
| 2014/0339950 A1* | 11/2014 | Nelson | ................. | H02K 17/205 310/211 |

FOREIGN PATENT DOCUMENTS

| | | |
|---|---|---|
| CN | 103066784 A | 4/2013 |
| DE | 19626807 C1 | 11/1997 |
| DE | 10258029 A1 | 7/2003 |
| DE | 102012208006 A1 | 11/2012 |
| DE | 102013218473 A1 | 3/2015 |
| DE | 102014208887 A1 | 11/2015 |
| DE | 102015224574 A1 | 6/2017 |
| EP | 1 016 197 A1 | 7/2000 |
| EP | 2 849 320 A2 | 3/2015 |
| JP | 2004-236456 A | 8/2004 |
| JP | 2013-090447 A | 5/2013 |
| WO | 97/02641 A1 | 1/1997 |
| WO | 97/45942 A1 | 4/1997 |
| WO | 97/45941 A1 | 12/1997 |

OTHER PUBLICATIONS

Office Action dated Nov. 21, 2019 in corresponding Chinese Application No. 201810426165.3; 15 pages including English-language translation.

Search Report dated Jan. 17, 2018 of corresponding German application No. 102017207671.2; 10 pgs.

European Search Report dated Sep. 10, 2018, in connection with corresponding EP Application No. 18164914.6 (7 pgs.).

Examination Report dated Oct. 7, 2020 in corresponding European Application No. 18 164 914.6; 9 pages including partial machine-generated English-language translation.

Office Action dated Jul. 30, 2020 in corresponding Chinese Application No. 201810426165.3; 15 pages including English-language translation.

* cited by examiner

ROTOR FOR AN ELECTRIC MACHINE, THE ROTOR HAS SHORT CIRCUIT BARS, SHORT CIRCUIT RING, AND SUPPORT DISC OF DIFFERENT MATERIALS

FIELD

The invention relates to a rotor for an electric machine, comprising a laminated core with a plurality of short-circuit bars passing through it, which are connected at both ends by way of a respective short-circuit ring.

BACKGROUND

Such a rotor, which is often also referred to as a rotor, is usually utilized in an asynchronous machine. In such an asynchronous machine, when it is operated as a generator, the rotor runs ahead of the rotating magnetic field of the stator surrounding the rotor and, when the asynchronous machine is operated as an electric motor, the rotor follows the rotating magnetic field of the stator. It is conventional to design the rotor as a so-called squirrel-cage or cage rotor, for which purpose the laminated core, which is formed from individual metal layers, is furnished with longitudinally directed short-circuit bars, which are short-circuited at both ends of the rotor by way of annular short-circuit rings. The short-circuit bars as well as the short-circuit rings are made of a highly conductive material, such as, for example, copper or aluminum. In particular, in mass production, the short-circuit bars and the short-circuit rings are cast in a casting process, usually a high-pressure die casting process, using a casting mold, whereby, on the side of the laminated core, corresponding grooves or channels are provided, in which the bars are molded, while, for formation of the short-circuit rings, corresponding cavities are provided at the casting mold.

Because the materials used for this, such as copper or aluminum, have a relatively low strength, resulting from the fact that they have an electrical resistance that is as small as possible and a high conductivity and therefore are used in a form that is as pure as possible, it is necessary to provide measures for stabilizing the short-circuit rings in order that, in operation, difficulties resulting from the effective centrifugal force do not arise. This is because, in association with the desire to increase the rotational speed of electric motors and hence the power density, ever higher requirements are increasingly being placed on the power density. This means that high requirements are placed on the high-speed performance. In order to meet these requirements, it is known from US 2014/0339950 A1, for example, to furnish short-circuit rings with a steel support ring that radially overlaps them and is connected to the respective short-circuit ring by way of a shrink fit. However, a problem of such a shrink fit can arise during operation, on account of the different thermal expansion coefficients of the materials used, in accordance with which, as described, the short-circuit ring is usually made of copper or aluminum, whereas the support ring is made of steel. For this reason, such a shrink fit cannot be created under the influence of temperature for certain material combinations.

In addition to casting of the short-circuit bars and short-circuit rings, it is also known to produce the short-circuit bars and the short-circuit rings as separate components and initially to arrange the short-circuit bars at the laminated core, after which the short-circuit rings are set in place and joined to the ends of the short-circuit bars by means of a welded joint, whereby short-circuit bars and short-circuit rings that are made of different materials are sometimes combined in this way. Examples of this are described in DE 196 26 807 C1, DE 102 58 029 A1, or DE 10 2014 208 887 A1.

SUMMARY

The invention is based on the object of presenting a rotor that is improved in comparison to known rotors, in particular, in order to meet the high requirements placed on the high-speed performance.

In the case of a rotor of the kind mentioned in the introduction, in order to achieve this object, it is provided that a support disc, which is made of a material that has a higher strength than the material of the short-circuit ring, is axially arranged at each short-circuit ring.

In the rotor according to the invention, in contrast to the prior art, no radial support by way of an additional support component is provided, but instead an axial support is provided. For this purpose, an annular support disc is placed axially on each short-circuit ring; that is, the support disc is put in place on the axial end surface of the respective short-circuit ring. The support disc itself is made of a material that has a higher strength than the material of the short-circuit ring. This design results in the rotor having an extremely good high-speed performance, without the danger of any deformation due to centrifugal force in the region of the short-circuit rings, said deformation resulting from the use of a relatively soft ring material. Namely, it has been found that short-circuit rings made of a soft material, such as, for example, copper or aluminum, tend at high rotational speed, to arch outward or to bend outward, respectively, as viewed in the region of their inner circumference, and consequently to deform in the region of their inner circumference as well, thereby strongly limiting the high-speed performance. The solution in accordance with the invention counteracts this in that an axial support disc, which is firmly connected to the respective short-circuit ring, acts in superposition and, owing to the higher strength of the support disc material, prevents such an arching or outward bending. This means that the support disc material has different strength properties and hence is mechanically stronger or more stable than the contrasting softer short-circuit ring material. Consequently, in an especially advantageous manner, an axial support or reinforcement of this kind prevents any deformation of the short-circuit rings resulting from high effective centrifugal forces, said deformation having hitherto strongly limited the high-speed performance. The use of a radial support element is therefore no longer required for the rotor according to the invention. At the same time, the additional arrangement of the hitherto known radial support rings is also not ruled out in the case that they should be appropriate in an individual instance.

Preferably, the rotor is equipped with cast short-circuit bars and short-circuit rings, which, therefore, have been produced in a casting process, preferably in a high-pressure die casting process. Generally, pure materials, such as copper or aluminum, are used for this purpose in order that the bars and rings have a high electrical conductivity, albeit combined with a relatively low strength/yield tensile strength in comparison to corresponding copper- or aluminum-based alloys, which, although they have a somewhat higher strength, have a lower electrical conductivity. In any case, regardless of whether very pure bar and ring material or else corresponding alloys is or are then used, the axial arrangement of the support or reinforcement ring is advantageous for increasing the high-speed performance.

Each support disc is preferably joined to the short-circuit ring by way of a welded joint, so that a firm, virtually material-bonded composite results. The welded joint can be produced by different methods, such as, for example, by friction welding, friction stir welding, electron beam welding, or electromagnetic pulse joining. Depending on the welding method used, either plastic phases or melt phases form at the boundary surfaces and form the virtually material-bonded or integrally bonded joint.

Preferably, moreover, the support disc is fabricated from a material that has a higher electrical conductivity than the material of the short-circuit ring. This affords the possibility that the support disc also contributes to the electrical conductivity of the electric machine as well as to the mechanical strength thereof. Moreover, there is an advantage in that the axial thickness of the short-circuit ring can be reduced, because the support disc, in turn, supplies a contribution to the electrical conductivity of the entire cage.

The support discs are preferably made of an aluminum or copper alloy. In particular, when the cast short-circuit rings are made of high-purity aluminum, the use of support discs made of a copper alloy, such as, for example, a CuCrZr alloy, is appropriate. Namely, the electrical conductivity of such a copper alloy is usually higher than that of aluminum, and a higher mechanical strength or a higher modulus of elasticity, respectively, than those of the aluminum short-circuit ring is associated therewith.

As already described, it has been found that the soft short-circuit rings arch out primarily at their inner circumference. For this purpose, an enhancement of the invention provides that each annular support disc has an inner diameter and an outer diameter, wherein at least the inner diameter corresponds to the inner diameter of the adjacent short-circuit ring and preferably also the outer diameter corresponds to the outer diameter of the adjacent short-circuit ring. Support discs and short-circuit rings thus have at least an equivalent inner diameter, so that the short-circuit ring is supported in the very region that tends to bend out without any reinforcement, and thus any bending is prevented. The radial width of the support disc can be chosen in such a way that the outer diameter is smaller than the outer diameter of the adjacent short-circuit ring or else at most corresponds to it. Consequently, in the latter case, the short-circuit ring is supported over its entire radial width or the entire axial end surface, respectively.

In addition to the rotor itself, the invention further relates to an electric machine, comprising a stator as well as a rotor of the kind described. What is involved in the case of the electric machine is an asynchronous machine.

Furthermore, the invention further relates to a method for producing a rotor of the kind described, which is characterized by the following steps:
provision of a laminated core,
installation of the short-circuit bars and the short-circuit rings,
installation of the support discs axially on the short-circuit rings.

The short-circuit bars and the short-circuit rings are preferably produced by casting in a casting mold.

In further development of the invention, the support discs, in turn, are joined to the short circuit rings by welding, for which purpose friction welding, friction stir welding, electron beam welding, or electromagnetic pulse joining offer themselves.

Used as support discs are preferably those made of an aluminum or copper alloy.

BRIEF DESCRIPTION OF THE DRAWINGS

Further advantages and details of the present invention ensue from the following exemplary embodiments as well as on the basis of the drawings. Shown are.

DETAILED DESCRIPTION OF THE DRAWINGS

Figure 1:
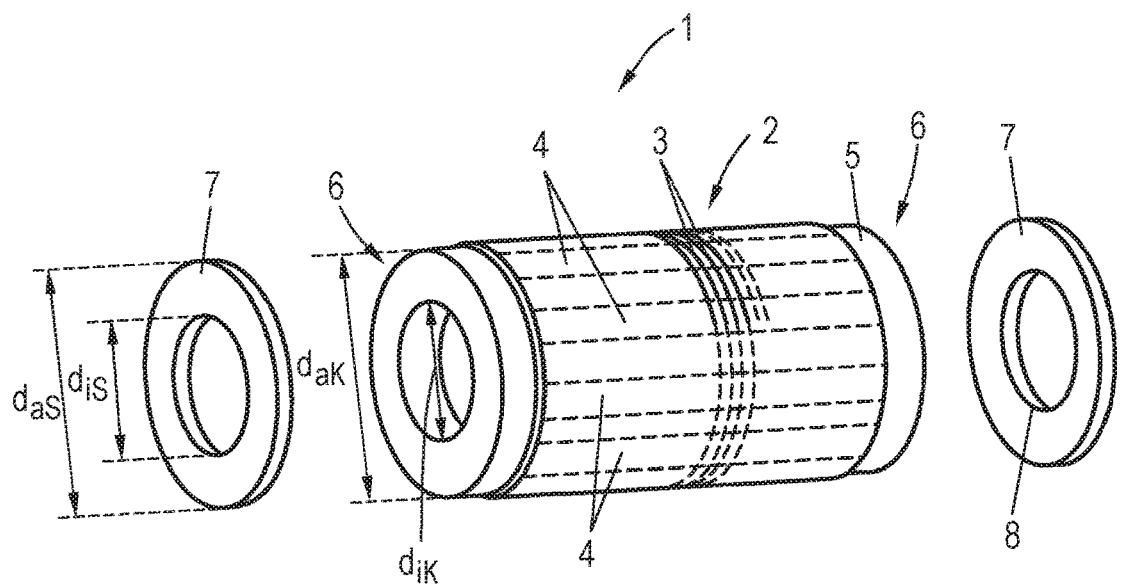
FIG. 1 a schematic drawing of a rotor according to the invention in an exploded view with support discs shown separately from the short-circuit rings, and
FIG. 2 a view of a rotor according to the invention with support discs installed on the short-circuit rings.

FIG. 1 shows a schematic drawing of a rotor 1 according to the invention for an electric machine in the form of an asynchronous machine. The rotor 1 is composed of a laminated core 2, which is only indicated in principle here and made up of a plurality of individual metal layers, which are arranged axially in succession to one another. Formed in the laminated core 2 are corresponding grooves or channels, in which, short-circuit bars 4, indicated here only by dashes, are accommodated and are short-circuited at their ends by way of respective short-circuit rings 5, which are arranged on the corresponding end sides of the laminated core 2. This means that the short-circuit bars 4 are joined directly to the short-circuit rings 5. Preferably, the short-circuit bars 4 as well as the short-circuit rings 5 are produced in a casting process, for which purpose the laminated core 2 is inserted into a corresponding casting mold. If necessary, the grooves or channels in which the short-circuit bars 4 are cast, are defined by way of the casting mold, but, in particular, the short-circuit rings 2 are defined by corresponding cavities in the mold parts. The short-circuit bars 4 as well as the short-circuit rings 5 are cast from a material that has a high electrical conductivity, such as, for example, aluminum or copper.

After production of the short-circuit bars 4 as well as the short-circuit rings 5, the annular support discs 7 are placed axially on the end surfaces 6 of the short-circuit rings 5. This is conducted by way of a welding process, such as, for example, friction welding, friction stir welding, electron beam welding, or electromagnetic pulse joining, with this list not being exhaustive. The inner diameter $d_{iS}$ of the bores 8 of the support discs 7 corresponds to the inner diameter $d_{iK}$ of the short-circuit rings 5; that is, both adjoin each other flush in the region of the respective inner diameter. In the example shown, the outer diameter $d_{aS}$ of the support discs 7 also corresponds to the outer diameter $d_{aK}$ the short-circuit rings 5. This means that a full-surface coverage of the end surfaces 6 is afforded by way of the support discs 7. However, this is not essential.

The support discs 7 themselves are made of a material that has a higher mechanical strength or a higher modulus of elasticity, respectively, than the short-circuit rings 5. If the short-circuit rings 5 are made of aluminum, for example, then support discs 7 made of a copper alloy—for example, a CuCrZr alloy—are appropriately used; said alloy has a higher electrical conductivity than the aluminum of the short-circuit ring 5 as well as a higher mechanical strength or a higher modulus of elasticity, respectively. Preferably, the support discs 7 have a higher electrical conductivity, but this is not essential and ultimately depends on the material pairing used, that is, the respective materials of the short-circuit rings 5 and the support discs 7.

In consequence of the virtually material-bonded connection of the support discs 7 to the short-circuit rings 5 and the fact that at least the inner diameter of the support discs 7 and the short-circuit rings 5 are the same, each short-circuit ring 5 is consequently supported and reinforced axially by way of the support discs 7. As a result of this, even at very high speeds and thus extremely high centrifugal forces that act on the otherwise relatively soft short-circuit ring material, the short-circuit rings 5 are not deformed, because the support discs 7 prevent any axial arching in the region of the inner diameter $d_{iK}$ of the short-circuit rings 5.

Figure 2:
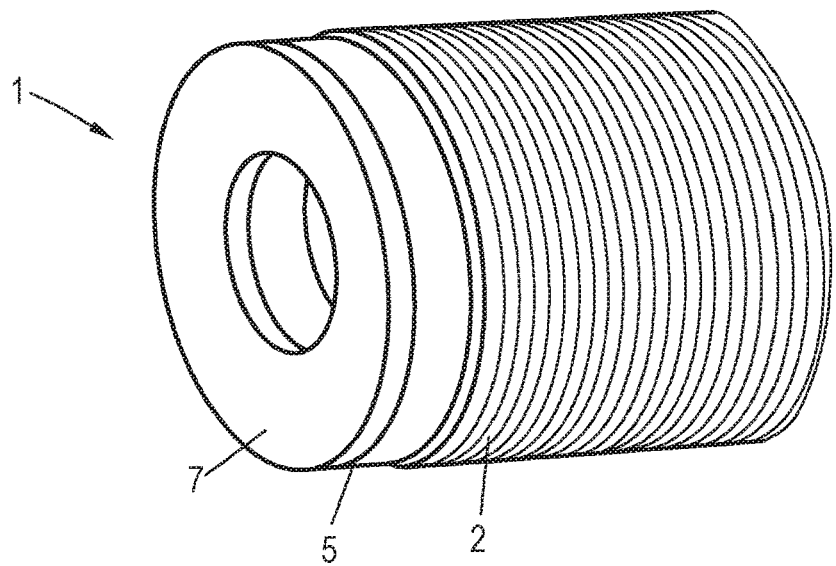

FIG. 2 shows a rotor 1, in which the support discs 7 are fastened at the short-circuit rings 5 by way of the welded joint. As can be seen, there results a full-surface coverage and thus a full-surface axial support or reinforcement. Said coverage makes possible a stabilization of the short-circuit rings 5 over the entire required temperature window and the operating speed range in which the rotor is operated.

Moreover, the welding processes described by way of example permit very diverse material combinations of short-circuit ring material and support ring material, so that the most diverse materials can be used for formation of the short-circuit rings 5 as well as the support discs 7.

The invention claimed is:

1. A rotor for an electric machine, comprising: a laminated core with a plurality of short-circuit bars that pass through the laminated core and are joined at both ends by way of a respective short-circuit ring, and a support disc axially arranged adjacent to each of the short-circuit rings, wherein each support disc is bounded radially by the corresponding short-circuit ring such that the support disc begins at an inner diameter of the short-circuit ring and extends up to an outer diameter of the short-circuit ring, wherein each support disc is thinner axially than the corresponding short-circuit ring, wherein each support disc is made a material which has a higher mechanical strength than that of the corresponding short-circuit ring and which has a higher electrical conductivity than that of the corresponding short-circuit ring, wherein each support disc is made of CuCrZr Alloy.

2. The rotor according to claim 1, wherein each support disc is made of an aluminum or copper alloy.

3. The rotor according to claim 1, wherein the short-circuit bars and the short-circuit rings are cast.

4. The rotor according to claim 3, wherein each support disc is joined to the corresponding short-circuit ring by way of a welded joint.

5. The rotor according to claim 4, wherein the welded joint is produced by friction welding, friction stir welding, electron beam welding, or electromagnetic pulse joining.

6. A method for producing a rotor for an electric machine, comprising: provision of a laminated core; installation of short-circuit bars into corresponding grooves or channels in the laminated core; joining a short-circuit ring to each end of the short-circuit bars; and joining a support disc to each of the short-circuit rings, wherein each support disc is axially arranged adjacent to the corresponding short-circuit ring, wherein each support disc is bounded radially by the corresponding short-circuit ring such that the support disc begins at an inner diameter of the short-circuit ring and extends up to an outer diameter of the short-circuit ring, wherein each support disc is thinner axially than the corresponding short-circuit ring, wherein each support disc is made of a material which has a higher mechanical strength than that of the corresponding short-circuit ring and which has a higher electrical conductivity than that of the corresponding short-circuit ring, wherein each support disc is made of a CuCrZr Alloy.

7. The method according to claim 6, wherein the short-circuit bars and the short-circuit rings are produced by casting in a casting mold.

8. The method according to claim 6, wherein each support discs is made of an aluminum or copper alloy.

9. The method according to claim 6, wherein each support discs is joined to the corresponding short-circuit rings by welding.

10. The method according to claim 9, wherein the welding is conducted by friction welding, friction stir welding, electron beam welding, or electromagnetic pulse joining.

* * * * *